United States Patent [19]

Mitsutake et al.

[11] Patent Number: 5,392,142
[45] Date of Patent: Feb. 21, 1995

[54] DISPLAY APPARATUS WITH CHIRAL SMECTIC AND POLYMER LIQUID CRYSTAL FILMS, EACH HAVING BIREFRINGENT FIRST STATE AND NOT BIREFRINGENT SECOND STATE

[75] Inventors: Hideaki Mitsutake, Tokyo; Kazuo Yoshinaga, Machida, both of Japan

[73] Assignee: Canon Kabushiki Kaisha, Tokyo, Japan

[21] Appl. No.: 266,320

[22] Filed: Jun. 27, 1994

Related U.S. Application Data

[63] Continuation of Ser. No. 673,070, Mar. 21, 1991, abandoned.

[30] Foreign Application Priority Data

Mar. 23, 1990 [JP] Japan ................................ 2-74654

[51] Int. Cl.$^6$ .................... G02F 1/133; G02F 1/1335; G02F 1/137
[52] U.S. Cl. ........................................ 359/53; 359/73; 359/93
[58] Field of Search ...................... 359/53, 73, 93, 100

[56] References Cited

U.S. PATENT DOCUMENTS

| | | | |
|---|---|---|---|
| 4,711,530 | 12/1987 | Nakanowatari et al. | 359/73 |
| 5,033,825 | 7/1991 | Ishikawa et al. | 359/73 |
| 5,066,107 | 11/1991 | Yoshinaga et al. | 359/45 |
| 5,132,826 | 7/1992 | Johnson et al. | 359/53 |
| 5,168,381 | 12/1992 | Walba | 359/53 |

FOREIGN PATENT DOCUMENTS

| | | | |
|---|---|---|---|
| 0219480 | 4/1987 | European Pat. Off. | 359/73 |
| 0298602 | 1/1989 | European Pat. Off. | 359/73 |
| 0134736 | 6/1986 | Japan | 359/53 |
| 0244019 | 10/1987 | Japan | 359/53 |
| 0265627 | 11/1987 | Japan | 359/53 |

OTHER PUBLICATIONS

Patent Abstracts of Japan, vol. 11, No. 268 (C-444) Aug. 29, 1987.
Patents Abstracts of Japan, vol. 13, No. 517 (P-962) Nov. 20, 1989.
Patent Abstracts of Japan, vol. 13, No. 456 (P-945) Oct. 16, 1989.
Clark et al., "Submicrosecond bistable electro-optic switching in liquid crystals", Applied Physics Letters, vol. 36, No. 11, (Jun. 1980) pp. 899-901.
Anderson et al., "Device physics of the soft—mode electro-optic effect", Journal of Applied Physics, vol. 66, No. 10 (Nov. 1989), pp. 4983-4995.

*Primary Examiner*—Anita Pellman Gross
*Attorney, Agent, or Firm*—Fitzpatrick, Cella, Harper & Scinto

[57] ABSTRACT

An optical modulation device is constituted by a polarizer; a first film forming a first state and a second state depending on an electric field applied thereto, the first state causing birefringence and the second state not causing birefringence respectively of polarized light from the polarizer, the first film having a thickness set for functioning as a halfwave plate in its first state; and a second film not causing birefringence of light having passed through the second state of the first film but causing birefringence of light having passed through the first state of the first film, the second film having a thickness set for functioning as quarter wave plate or a halfwave plate when the first film is set in its first state. The light from the second film is caused to enter the second film again through a reflection means or a third film selectively forming a first state causing birefringence of light which has caused birefringence and passed through the second film or a second state not causing birefringence of light which has passed through the second film without causing birefringence. The light thus modulated is then caused to enter an analyzer. As a result, an optical modulation giving a large contrast is provided by using a material having a small birefringence effect for the first film or third film.

15 Claims, 6 Drawing Sheets

BEFORE REFLECTION

AFTER REFLECTION

FIRST STABLE STATE

SECOND STABLE STATE

DISPLAY APPARATUS WITH CHIRAL SMECTIC AND POLYMER LIQUID CRYSTAL FILMS, EACH HAVING BIREFRINGENT FIRST STATE AND NOT BIREFRINGENT SECOND STATE

This application is a continuation of application U.S. Ser. No. 07/673,070, filed Mar. 21, 1991, now abandoned.

FIELD OF THE INVENTION AND RELATED ART

The present invention relates to an optical modulation device using a material having a refractive index anisotropy, particularly an optical modulation device using a ferroelectric chiral smectic liquid crystal, and a display apparatus using the same.

Among optical modulation devices using a ferroelectric chiral smectic liquid crystal, a type of device wherein a thin layer of the liquid crystal is disposed between two parallel substrates with a very thin gap (e.g., 1-2 microns) therebetween to form a bistable state according to the surface action of the two substrates (SSFLC: surface-stabilized ferroelectric liquid crystal; Appl. Phys. Lett. 36 (1980), 899), is used for various applications because of its high-speed responsiveness, memory characteristic, etc.

The above-mentioned bistability-type ferroelectric liquid crystal device provides two stable states of liquid crystal molecules forming a certain angle from an axial direction (e.g., rubbing direction) on alignment surfaces formed by the liquid crystal sides of the two substrates sandwiching the thin layer of the liquid crystal. A half of the angle between the two stable states is referred to as a tilt angle (hereinafter denoted by $\theta_c$). When a voltage is applied in a direction perpendicular to the liquid crystal layer of the liquid crystal device, the ferroelectric liquid crystal is switched from one stable state to the other stable state. This change corresponds to rotation of an optical axis of a material having a refractive index anisotropy by an angle $2\theta_c$. Accordingly, if polarized light is incident to a ferroelectric liquid crystal device of the above-mentioned type having a thickness corresponding to the function of a halfwave plate, the bistable two states show polarized light-rotating functions which mutually differ from each other by $4\theta_c$ with respect to the incident polarized light. If the above-mentioned ferroelectric liquid crystal device is sandwiched between a pair of polarizers (polarizing plates, etc.) disposed in cross nicols or parallel nicols, the ON/OFF ratio of the transmitted light quantities (transmittance ratio, contrast) between the two stable states becomes the highest under the condition of:

$4\theta_c = 90$ degrees (i.e., $\theta_c = 22.5$ degrees).

However, the above-mentioned tilt angle $\theta_c$ strongly depends on the liquid crystal material and the property of the alignment surface, so that any ferroelectric liquid crystal devices obtained heretofore have failed to provide a sufficient tilt angle $\theta_c$, thus failing to provide a sufficient degree of optical modulation when used as an optical modulation device.

SUMMARY OF THE INVENTION

An object of the present invention is to provide an optical modulation device realizing a high-contrast display and a display apparatus using the same.

Another object of the present invention is to provide an optical modulation device accomplishing a high-transmittance characteristic and a display apparatus using the same.

According to an aspect of the present invention, there is provided an optical modulation device, comprising:

a polarizer;

a first film forming a first state and a second state depending on an electric field applied thereto, the first state causing birefringence and the second state not causing birefringence respectively of polarized light from the polarizer, the first film having a thickness set for functioning as a halfwave plate in its first state; and a second film not causing birefringence of light having passed through the second state of the first film but causing birefringence of light having passed through the first state of the first film, the second film having a thickness set for functioning as a halfwave plate when the first film is set in its first state, the second film being so arranged that light having passed through the second film without causing birefringence is caused to pass through a second state not causing birefringence and light having passed through the second film while causing birefringence is caused to pass through a first state causing birefringence, followed by passing of the light through an analyzer.

According to another aspect of the present invention, there is provided an optical modulation device, comprising:

a polarizer;

a first film forming a first state and a second state depending on an electric field applied thereto, the first state causing birefringence and the second state not causing birefringence respectively of polarized light from the polarizer, the first film having a thickness set for functioning as a halfwave plate in its first state;

a second film not causing birefringence of light having passed through the second state of the first film but causing birefringence of light having passed through the first state of the first film, the second film having a thickness set for functioning as a quarter wave plate when the first film is set in its first state;

a reflecting means for reflecting light having passed through the second film again to the second film; and an analyzer.

According to still another aspect of the present invention, there is provided an optical modulation device, comprising:

a polarizer;

a first film forming a first state and a second state depending on an electric field applied thereto, the first state causing birefringence and the second state not causing birefringence respectively of polarized light from the polarizer, the first film having a thickness set for functioning as a halfwave plate in its first state;

a second film not causing birefringence of light having passed through the second state of the first film but causing birefringence of light having passed through the first state of the first film, the second film having a thickness set for functioning as a quarter wave plate when the first film is set in its first state;

a third film selectively forming a first state causing birefringence of light which has caused birefringence and passed through the second film or a second state not causing birefringence of light which has passed through the second film without causing birefringence, and an analyzer.

According to a further aspect of the present invention, there is provided an optical modulation device, comprising:

a polarizer;

a first film forming a first state and a second state different from the first state depending on an electric field applied thereto, the first state causing birefringence and the second state causing or not causing birefringence respectively of polarized light from the polarizer;

a second film having a thickness set for functioning as a halfwave plate for light having passed through the first film;

a third film having a first state and a second state different from the first state depending on an electric field applied thereto depending on an electric field applied thereto, the first state causing birefringence and the second state causing or not causing birefringence respectively of light having passed through the second film; and an analyzer.

According to a still further aspect of the present invention, there is provided a display apparatus, comprising:

a light source for emitting indefinitely polarized light;

a polarization beam splitter;

an optical modulation device including (a) a first film forming a first state and a second state depending on an electric field applied thereto, the first state causing birefringence and the second state not causing birefringence respectively of polarized light from the polarization beam splitter, the first film having a thickness for functioning as a halfwave plate in its first state, (b) a second film not causing birefringence of light having passed through the second state of the first film but causing birefringence of light having passed through the first state of the first film, the second film having a thickness set for functioning as a quarter wave plate when the first film is set in its first state, and (c) a reflection means for reflecting light having passed through the second film again to the second film and the polarization beam splitter; and a voltage application means.

DESCRIPTION OF THE PREFERRED EMBODIMENTS

Figure 4A:
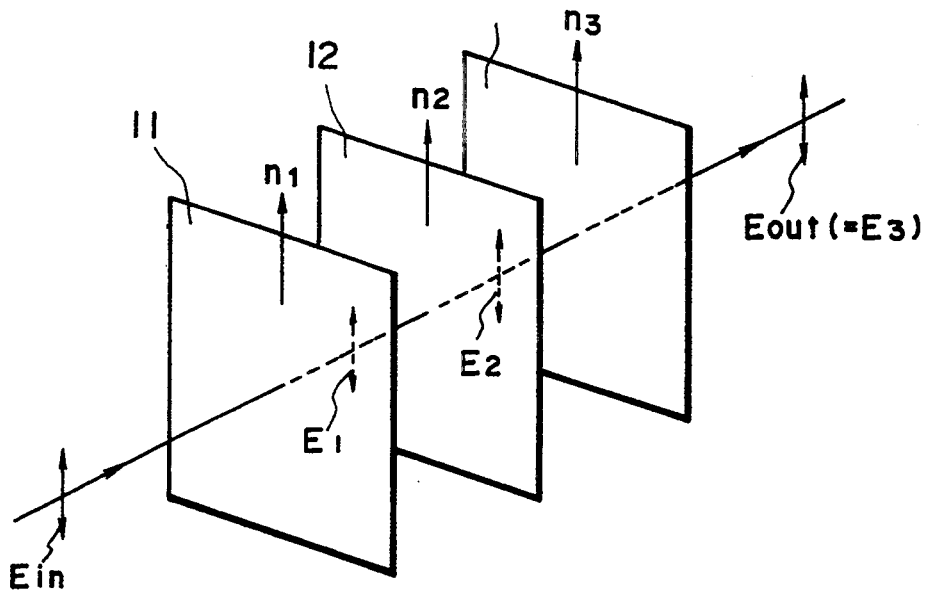
FIGS. 4A and 4B are schematic perspective views for illustrating another function or action of the invention.
Figure 4B:
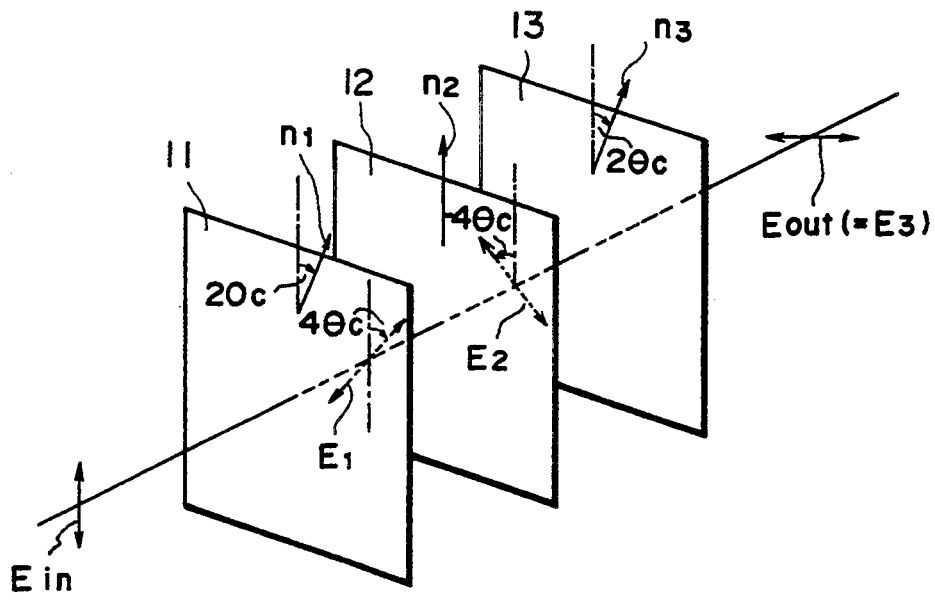

FIGS. 4A and 4B are schematic perspective views for illustrating a function or action of the present invention.

A liquid crystal device illustrated in FIG. 4A comprises films 11 and 13 of an identical bistable ferroelectric liquid crystal having an identical alignment axis direction and a halfwave plate 12 disposed between the films 11 and 13. The long axis directions $n_1$ and $n_3$ of liquid crystal molecules (more strictly, principal axis directions of index ellipsoids of liquid crystal molecules) at one stable state (first stable state) of the above-mentioned two ferroelectric liquid crystal films 11 and 13 and a principal axis direction $n_2$ of the index ellipsoid of the halfwave plate 12 are all directed in the same direction. The three films 11, 12 and 13 are parallel to each other and each of them has a function corresponding to that of a halfwave plate with respect to a dominant wavelength. When an electromagnetic wave having a vibrating electric field Ein parallel to $n_1$, $n_2$ and $n_3$ is incident to the liquid crystal device disposed in the above-described manner, the resultant magnetic waves $E_1$, $E_2$ and $E_3$ (=Eout, outgoing wave) having passed the films 11, 12 and 13, respectively, do not change their vibrating electric fields (Ein/$E_1$/$E_2$/Eout (=$E_3$)).

On the other hand, FIG. 4B shows an arrangement of the same device when the bistable ferroelectric liquid crystal films 11 and 13 are oriented to the other stable state (second stable state), the liquid crystal long axes in the ferroelectric liquid crystal films 11 and 13 are rotated by $2\theta_c$ in the same direction from the vibrating electric field Ein of the incident light. As a result, the electric field $E_1$ of the light having passed through the first liquid crystal film 11 is rotated by $4\theta_c$ from Ein of the incident light. Then, the electric field $E_2$ of the light having passed through the halfwave plate 12 is caused to assume a direction rotated by $-4\theta_c$ from the princi7 pal axis $n_2$ of the plate. Finally, the electric field $E_3$ (=Eout) of the light having passed through the second liquid crystal film 13 which has a liquid crystal molecular long axis $n_3$ rotated by $6\theta_c$ (=$4\theta_c + 2\theta_c$) from $E_2$, is caused to assume a direction rotated by $6\theta_c$ from the liquid crystal molecular long axis $n_3$. Consequently, the electric field Eout of the outgoing light is caused to have a direction which is rotated by $8\theta_c$ (=$2\theta_c + 6\theta_c$) with respect to the electric field Ein of the incident light. This means that it is possible to obtain a rotation angle of polarized light which is twice that obtained by a single liquid crystal film. Accordingly, only a tilt angle $\theta_c = 11.25$ degrees (giving $8\theta_c = 90$ degrees) is required to provide a maximum on/off ratio (transmittance ratio, contrast).

In this instance, in the present invention, the liquid crystal films 11 and 13 may preferably have a thickness d providing an optical phase difference $\Delta$nd ($\Delta n(=n_\parallel - n_\perp)$: refractive index anisotropy) of approximately $\frac{1}{2}\lambda$ ($\lambda$: wavelength of light), e.g., 0.9 to $1.1 \times \lambda/2$, more specifically e.g., a thickness of 1.2–1.6 microns. Particularly, when the liquid crystal films 11 and 13 comprise a chiral smectic liquid crystal and the thickness is in the range of 1.2–1.6 microns, the helical structure of the chiral smectic liquid crystal is suppressed to form an alignment state developing bistability.

Figure 1:
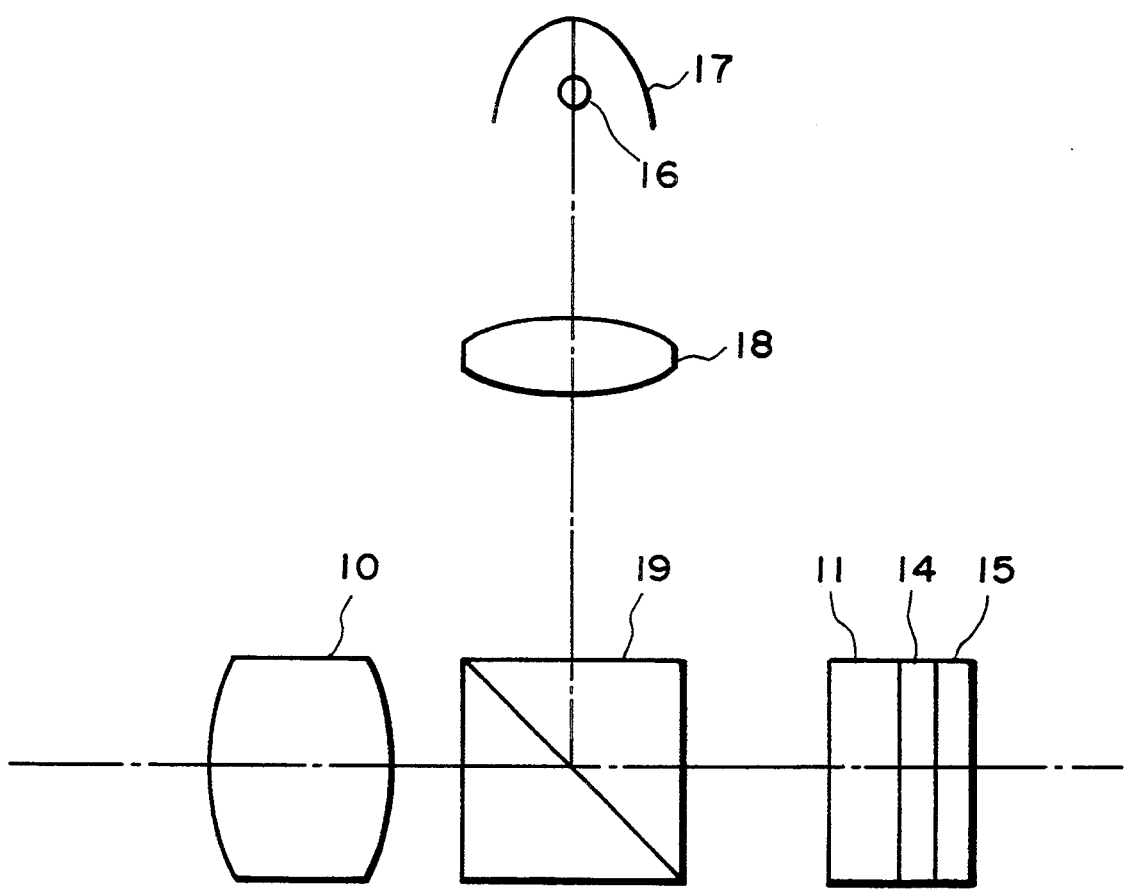
FIG. 1 is a schematic sectional illustration of an embodiment of the display apparatus according to the invention.
Figure 2A:
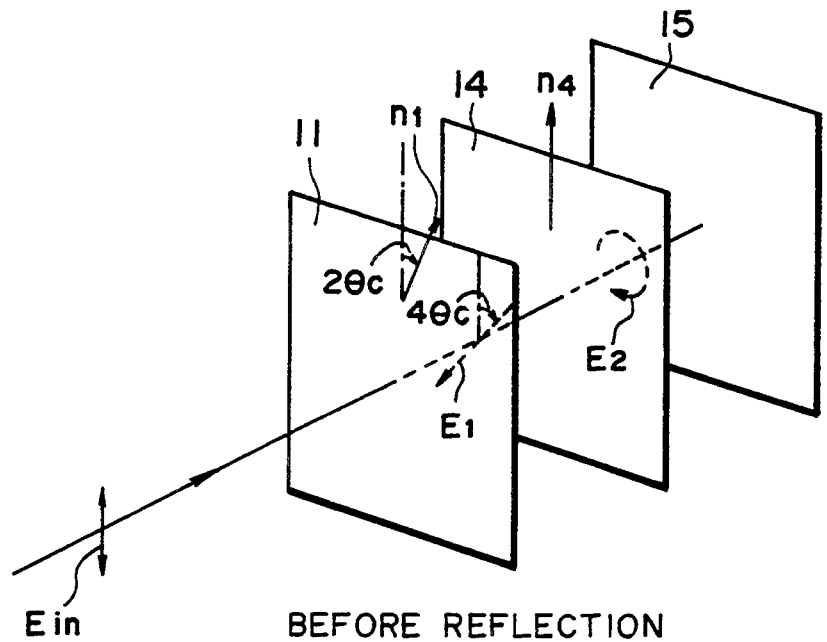
FIGS. 2A and 2B are schematic perspective views for illustrating a function or action of the invention.
Figure 2B:
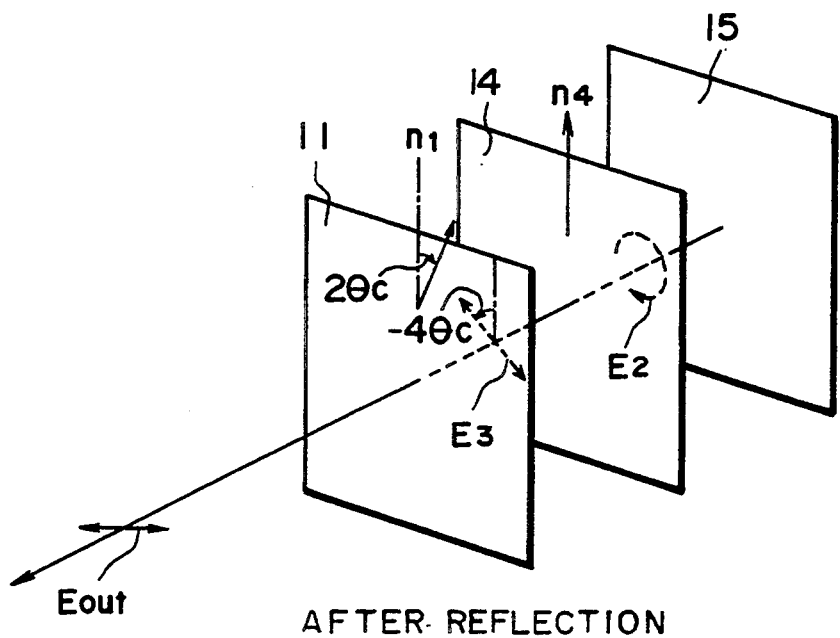
Figure 3:
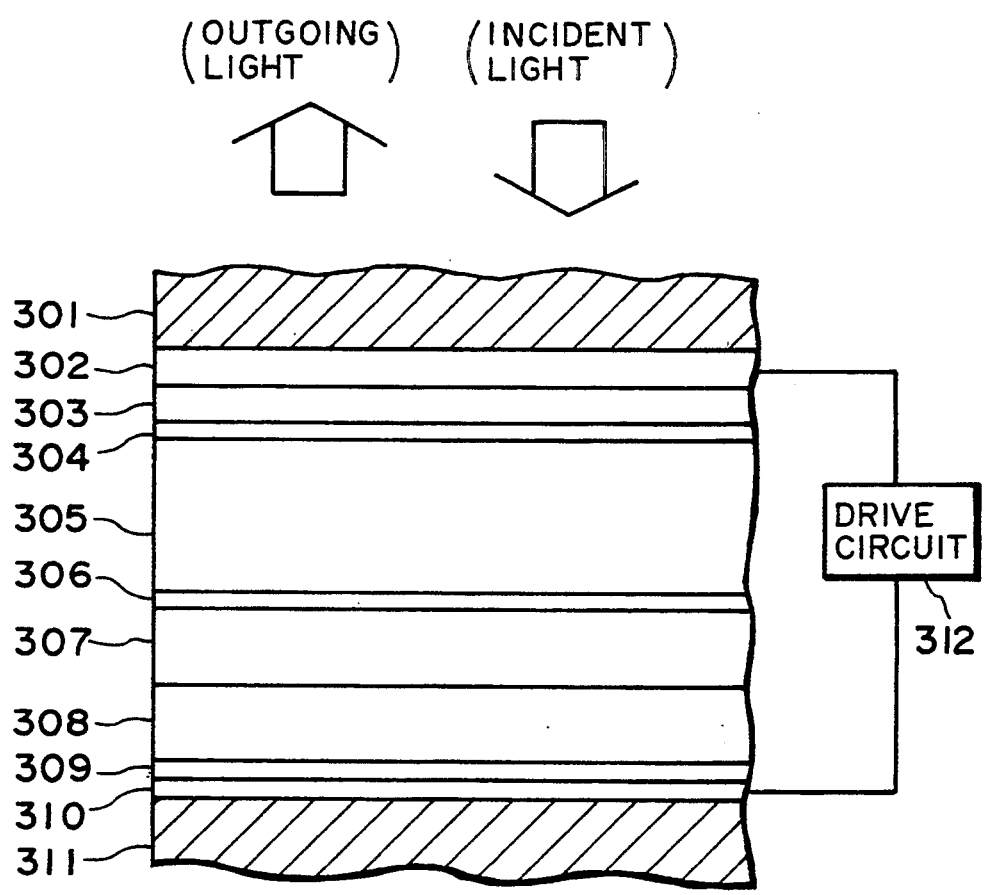
FIG. 3 is a partial sectional view of an embodiment of the optical modulation device according to the invention.

FIG. 1 schematically illustrates an embodiment of the display apparatus which is constituted as a projection-type one including another embodiment of the optical modulation device according to the present invention. The function of the optical modulation device is illustrated in FIGS. 2A and 2B, and the detailed structure thereof is shown in FIG. 3 as a partial sectional view.

Referring to FIG. 1, indefinitely polarized light emitted from a light source 16 is reflected by a reflecting shade 17, collimated by a condenser lens 18 and incident to a polarization beam splitter 19, where a P polarization component is allowed to pass and an S polarization component is reflected in the perpendicular direction.

The S component is caused to pass through a bistable ferroelectric liquid crystal film 11 functioning as a half-wave plate and a quarter wave plate 14, reflected at a reflection plate 15, and again caused to pass through the quarter wave 14 and the bistable ferroelectric liquid crystal film 11.

As a result, the above-mentioned S polarization component yields a P polarization component depending on the state of the bistable ferroelectric liquid crystal film 11 and, when it again enters the polarization beam splitter 19, the S polarization component is reflected and the P polarization component is allowed to pass to be projected by a projection lens 10 to form an image on an image projection screen (not shown). In this embodiment, the polarization beam splitter 19 functions as a polarizer and analyzer.

FIGS. 2A and 2B are enlarged illustrations of the optical modulation device including the ferroelectric liquid crystal film 11, the quarter wave plate 14 and the reflection plate 15. Referring to these figures, the incident light is linearly polarized light having a vibrating electric field Ein. When the long axis $n_2$ of the ferroelectric liquid crystal 11 is in one stable state (first stable state) as represented by a dot-and-dash line which is parallel to the refractive principal axis $n_4$ of the half-wave plate and Ein, no rotation of the polarized light occurs. However, when the long axis $n_1$ of the liquid crystal 11 assumes a direction which is rotated by an angle $2\theta_c$ from Ein as shown in FIGS. 2A and 2B, the light having passed through the liquid crystal film 11 is caused to have an electric field $E_1$ which is rotated by $4\theta_c$ from Ein as shown in FIG. 2A. Then, the light having passed through the quarter wave plate 14 is converted into circularly polarized light represented by $E_2$, which is reflected at the reflection plate 15 and again enters the quarter wave plate 14. Here, the two-times of passing through the quarter wave plate is identical to passing once through a halfwave plate, so that the light having passed again through the halfwave plate 14 and entering again the liquid crystal film 11 is caused to have an electric field $E_3$ which is rotated by $-4\theta_c$ from a principal axis $n_4$ of the quarter wave plate 14. Finally, the light having passed through the liquid crystal film 11 which has a molecular long axis $n_4$ rotated by $6\theta_c$ $(=4\theta_c+2\theta_c)$ from $E_3$, is caused to have an electric field E out $(=E_4)$ which is rotated by $6\theta_c$ from the axis $n_1$ and is thus rotated by $8\theta_c$ $(=2\theta_c+6\theta_c)$ from the electric field Ein of the incident light.

By using a reflection type arrangement as described above, a single optical modulation device can provide a polarization rotation angle which is twice that attained by using the optical modulation device in an ordinary way.

FIG. 3 is a partial sectional view of a specific embodiment of the optical modulation illustrated by FIGS. 2A and 2B. Referring to FIG. 3, the optical modulation device has a laminate structure including, from the incident light side, a transparent glass substrate 301 (thickness: about 1 mm), a transparent ITO film 302 (thickness: about 1500 Å), functioning as an electrode, an insulating film 303 (thickness: about 1200 Å) for preventing short circuit with a counter electrode, a rubbed polyimide film 304 (thickness: about 200 Å) for aligning liquid crystal, a liquid crystal film 305 formed by injection into a spacing held by spacer beads having a diameter of 1–2 microns (not shown), a polyimide film 306 (thickness: 200 Å) similar to the polyimide film 304, a thin transparent layer 307 (i.e., of a glass plate) functioning as a substrate for the polyimide film 306, a polymer liquid crystal film 308 (thickness: $\leq 1$ micron) having a refractive index anisotropy and a function corresponding to a quarter wave plate, a rubbed polyimide film 309 (thickness: about 200 Å) for aligning the polymer liquid crystal, a vapor-deposited aluminum film 310 (thickness: several microns), and a glass substrate 311 (thickness: about 1 mm).

The above-mentioned optical modulation device may be obtained by forming the required layers respectively on the glass substrates 301 and 311 and injecting a liquid crystal material into a space 305 formed between the substrates 301 and 311, followed by heat-treatment, etc., to provide a bistable ferroelectric liquid crystal state. The optical modulation of the outgoing light may be effected by voltage application to the electrodes through a drive circuit 312.

The optical modulation device may be provided with a multiplicity of pixels, which can be independently controlled and easily applied to image display. For example, each of the ITO electrode 302 and the aluminum electrode 310 may be divided into independent electrodes in the form of stripes which are disposed to intersect each other so as to form a matrix electrode structure (Such as a so-called "simple matrix drive"). In image display using such a matrix electrode structure, it is necessary to use a smaller pixel size in order to provide a picture of certain size with a higher resolution and, for example, a small liquid crystal display device with a small diagonal size of 3 inches as used for a projection-type display apparatus may be formed to have a pixel size of 60×60 microns for, e.g., EDTV.

In the arrangement of the present invention, the thickness of the quarter wave plate can be reduced to 1 micron or less by using a polymer liquid crystal having a refractive index anisotropy ($\Delta n$ of about 0.2) which is remarkably larger (by one or two digits) than those of quartz, mica, stretched film, etc.

Further, the glass plate 307 disposed as a substrate for the polyimide film 306 may be composed of a very thin glass plate having a thickness of, e.g., 10–100 microns, preferably 10–50 microns, since it is formed on the glass substrate 111 which has a sufficient thickness for ensuring a required device strength. The other layers between the pixel electrodes 302 and 310 are sufficiently thinner than one pixel size, so that the use of a thin quarter wave plate 308 of a polymer liquid crystal and a very thin glass plate 307 is very effective for providing a high pixel area ratio (effective aperture ratio) and preventing crosstalk between pixels.

In the operation of the above-mentioned device of the present invention, a positive-polarity pulse or a negative-polarity pulse is selectively applied through the drive circuit between a pair of electrodes formed by the ITO film 302 and the vapor-deposited aluminum film 310 so as to orient the ferroelectric liquid crystal in the liquid crystal film to a first stable state or a second stable state corresponding to the positive-polarity or negative-polarity pulse.

In a specific embodiment, the polymer liquid crystal film 308 was formed by using a nematic polymer liquid crystal of the following structure (PAfB):

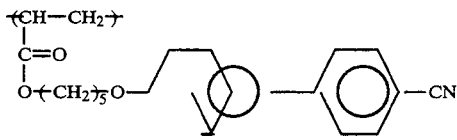

having a number-average molecular weight of 12520 and a weight-average molecular weight of 20744 (calculated corresponding to standard polystyrene based on gel permeation chromatography using THF solvent and showing a phase transition series as follows:

A cyclohexanone solution (10 wt. %) of the above polymer liquid crystal was applied onto a 500 Å-thick polyimide film 309 (trade name: "SE-100" mfd. by Nissan Kagaku Kogyo K. K.) by spin coating, followed by 2–3 hours of heat treatment at 100° C. to form a uniformly aligned polymer liquid crystal layer in a thickness of 5500 angstroms.

In the above embodiment, the polarization axis Ein of the incident light, the molecular long axis $n_1$ in one stable state of the liquid crystal and a principal axis $n_4$ of the quarter wave plate are aligned with each other, whereby at least one state free from deviation in phase difference even for a wavelength other than a dominant wavelength is realized in one stable state. Accordingly, when cross nicol polarizers are used, a high contrast can be realized by suppressing the transmittance in a black state, and when parallel nicol polarizers are used, a hue change in a white state can be suppressed.

Essentially, however, the combination of axial directions of the three films is not restricted and 0% or 100% modulation is possible for any combination at least with respect to a predominant wavelength. In this instance, the polymer liquid crystal film 308 may preferably have a thickness d in the range of 0.6–0.8 micron so as to provide an optical path difference $\Delta nd$ of approximately $\lambda/4$.

Figure 5:
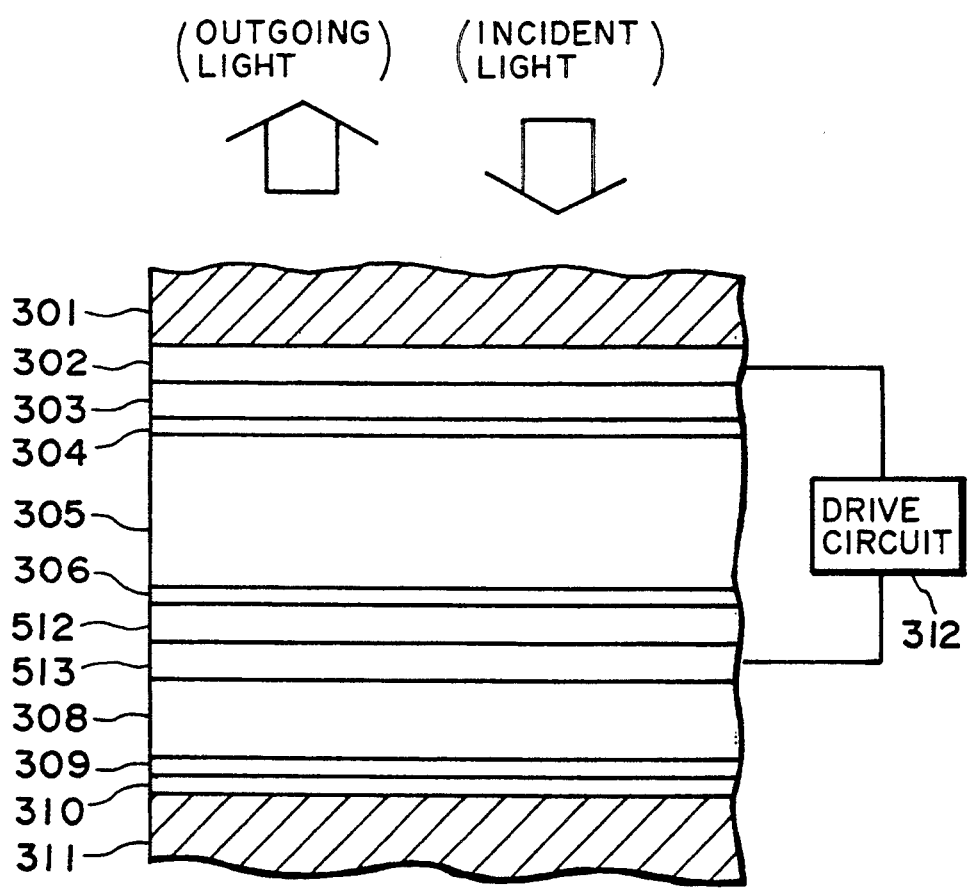
FIGS. 5 and 6 are respectively partial sectional views of other embodiments of the optical modulation device according to the invention.

FIG. 5 is a partial sectional view of another embodiment of the optical modulation device of the invention, wherein identical members are denoted by the same reference numerals as in FIG. 3. In this embodiment, a rubbed polyimide film 306, an insulating film 512 of an insulating material, such as SiO, $SiO_2$ or $TiO_2$, and an ITO film 513 acting as an electrode are disposed between a polymer liquid crystal film 308 and a liquid crystal film 305. A positive polarity pulse and a negative polarity pulse are applied between the ITO films 302 and 513 from the drive circuit 312.

According to this embodiment, the applied voltage for optical modulation can be decreased because of a decreased spacing between the electrodes. The vapor-deposited aluminum film 310 in the figure acts as a reflection film.

Figure 6:
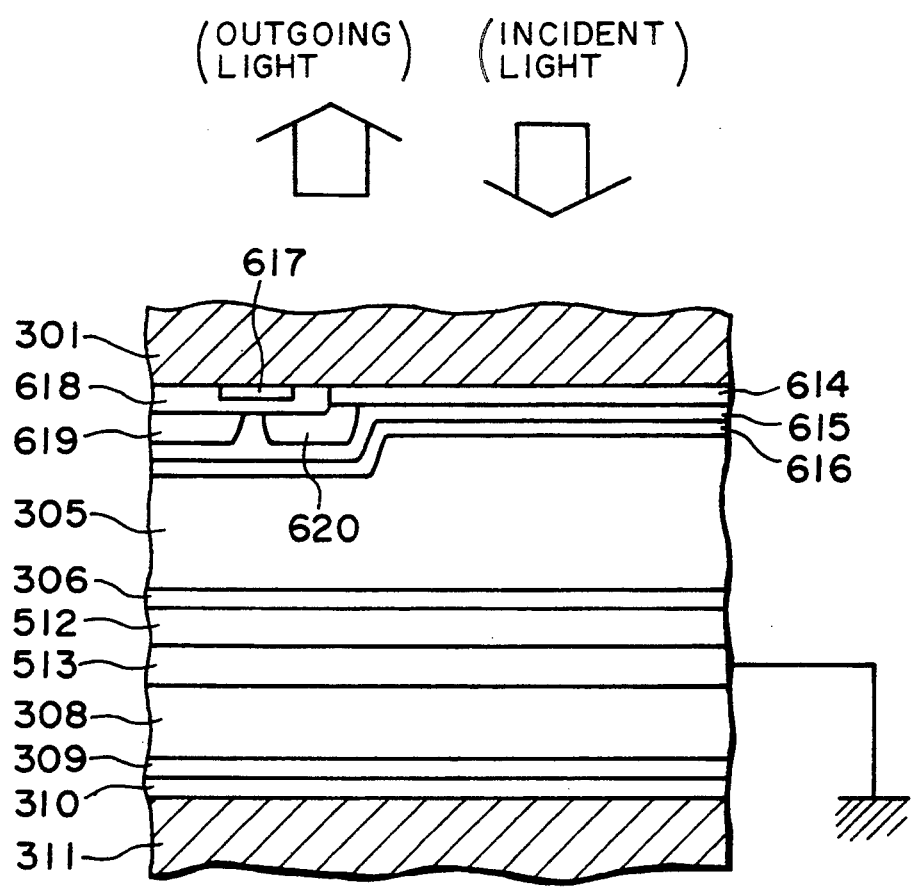

FIG. 6 is a partial sectional view of still another embodiment of the optical modulation device of the invention, wherein identical members are denoted by the same reference numerals as in FIGS. 3 and 5. In this embodiment, an active matrix drive system using thin film transistors (TFTs) in a cell is adopted. More specifically, the optical modulation device according to this embodiment includes a transparent ITO electrode 614, an insulating film 615 (of, e.g., $SiO_2$), a rubbed polyimide film 616, a TFT including a gate 617 coated with an insulating film 618 of silicon nitride, a source 619 and a drain 620.

Hereinabove, the present invention has been explained based on several preferred embodiments but the present invention is also applicable in the following manner.

(1) Ferroelectric liquid crystal devices are used in the above embodiments, but the present invention is also advantageously applicable generally to a type of devices wherein the birefringence characteristic is controlled by an electric field.

(2) A projection-type display apparatus has been explained but other applications are suitable, for example the invention is also advantageously used for a direct watching-type display apparatus.

(3) Only two degrees of modulation, i.e., 0% and 100%, have been explained, but the present invention is advantageously applicable to various type of gradation-control systems, including a density gradation system using an intermediate polarization rotation angle, an areal gradation system controlling the areal ratio between 0% and 100% modulation, and a mixed system of these.

(4) An aligned polymer liquid crystal film is used as a quarter waveplate in the above-embodiments, but quartz, mica stretched film, etc., may also be used while retaining at least the advantage of using a single liquid crystal modulation device.

As described hereinabove, according to the present invention, the following advantageous effects are specifically attained.

(i) It is possible to effect a modulation providing a large contrast by using even a material showing a small tilt angle.

(ii) A simple device structure can be realized by adopting a reflection-type arrangement, so that the production process can be simplified.

(iii) By using a polymer liquid crystal layer as a quarter wave plate or halfwave plate, an increased aperture ratio and a minimization of crosstalk between pixels (leakage of light into another pixel) can be realized. Particularly, (a) a polymer liquid crystal has a larger refractive index anisotropy than an ordinary birefringence material (such as quartz, mica, and stretched film), so that the quarter wave plate or halfwave plate can be made thinner to alleviate a decrease in aperture rate and crosstalk between pixels; and (b) the polymer liquid crystal can be aligned at a high temperature providing a large fluidity and used in a temperature region providing a stable alignment, so that easier handling is possible than a low-molecular weight liquid crystal similarly having a large refractive index anisotropy.

What is claimed is:

1. An optical modulation device, comprising:
   a polarizer;
   a first film forming a first state and a second state depending on an electric field applied thereto, the first state causing birefringence and the second state not causing birefringence respectively of polarized light from the polarizer, the first film having a thickness set for functioning as a halfwave plate in its first state;

a second film of a polymer not causing birefringence of light having passed through the second state of the first film but causing birefringence of light having passed through the first state of the first film, the second film having a thickness set for functioning as a quarter wave plate that is not driver when the first film is set in its first state;

a reflecting means for reflecting light having passed through the second film again to the second film; and an analyzer.

2. A device according to claim 1, wherein said first film comprises a liquid crystal.

3. A device according to claim 2, wherein said liquid crystal is a chiral smectic liquid crystal having bistability.

4. A device according to claim 1, wherein said second film comprises a polymer liquid crystal.

5. A device according to claim 1, which further comprises voltage application means including a pair of electrodes disposed to sandwich the first film.

6. A device according to claim 1, which further comprises voltage application means including a pair of electrodes disposed to sandwich the first film, and means for applying a pulse of one polarity and a pulse of the other polarity selectively between the pair of electrodes.

7. A device according to claim 1, wherein said first film has a thickness of 1.2–1.6 microns.

8. A device according to claim 1, wherein said second film has a thickness of 0.6–0.8 micron.

9. A device according to claim 1, which further comprises a voltage application means including a pair of electrodes sandwiching the first film with one of said pair of electrodes being disposed between the first film and the second film.

10. A device according to claim 9, wherein said first film comprises a bistable chiral smectic liquid crystal and said second film comprises a polymer liquid crystal.

11. A device according to claim 9, which further comprises a means for applying a pulse of one polarity and a pulse of the other polarity selectively between the pair of electrodes.

12. A display apparatus, comprising:

a light source for emitting indefinitely polarized light;

a polarization beam splitter;

an optical modulation device including (a) a first film forming a first state and a second state depending on an electric field applied thereto, the first state causing birefringence and the second state not causing birefringence respectively of polarized light from the polarization beam splitter, the first film having a thickness for functioning as a half-wave plate in its first state, (b) a second film of a polymer not causing birefringence of light having passed through the second state of the first film but causing birefringence of light having passed through the first state of the first film, the second film having a thickness set for functioning as a quarter wave plate that is not driven when the first film is set in its first state, and (c) a reflection means for reflecting light having passed through the second film again to the second film and the polarization beam splitter; and a voltage application means.

13. An apparatus according to claim 12, wherein said first film comprises a liquid crystal.

14. An apparatus according to claim 13, wherein said liquid crystal is a chiral smectic liquid crystal having bistability.

15. An apparatus according to claim 12, wherein said second film comprises a polymer liquid crystal.

* * * * *

UNITED STATES PATENT AND TRADEMARK OFFICE
CERTIFICATE OF CORRECTION

PATENT NO. : 5,392,142   Page 1 of 2
DATED : February 21, 1995
INVENTOR(S) : HIDEAKI MITSUTAKE, ET AL.

It is certified that error appears in the above-indentified patent and that said Letters Patent is hereby corrected as shown below:

On title page, item

[56] References Cited

Other Publications, "Patents" should read --Patent--.

COLUMN 4

Line 39, "princi7" should read --princi- --.

COLUMN 6

Line 36, "(Such" should read --(such--.

COLUMN 7

Line 10, 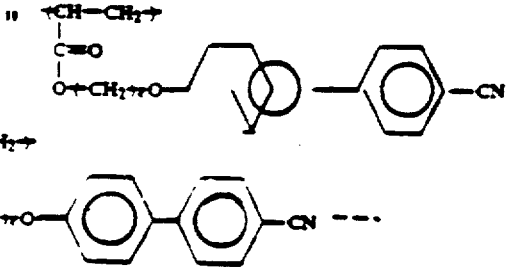 should read 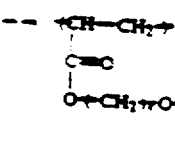.

COLUMN 8

Line 15, "vices" should read --vice--;

Line 23, "type" should read --types--;

Line 55, "so that" should read --which is handled--; and "handling is" should be deleted; and Line 56, "possible" should be deleted.

UNITED STATES PATENT AND TRADEMARK OFFICE
CERTIFICATE OF CORRECTION

PATENT NO. : 5,392,142
DATED : February 21, 1995
INVENTOR(S) : HIDEAKI MITSUTAKE, ET AL.

It is certified that error appears in the above-indentified patent and that said Letters Patent is hereby corrected as shown below:

<u>COLUMN 9</u>

Line 7, "driver" should read --driven--.

Signed and Sealed this

Twenty-seventh Day of June, 1995

Attest:

BRUCE LEHMAN

Attesting Officer     Commissioner of Patents and Trademarks